United States Patent
Ohkubo et al.

(10) Patent No.: US 7,803,443 B2
(45) Date of Patent: Sep. 28, 2010

(54) OPTICAL DISK INCLUDING A SULFURATION SUPPRESSING DIELECTRIC FILM

(75) Inventors: Shuichi Ohkubo, Tokyo (JP); Eiji Kariyada, Tokyo (JP)

(73) Assignee: NEC Corporation, Tokyo (JP)

( * ) Notice: Subject to any disclaimer, the term of this patent is extended or adjusted under 35 U.S.C. 154(b) by 849 days.

(21) Appl. No.: 11/590,793

(22) Filed: Nov. 1, 2006

(65) Prior Publication Data
US 2007/0104920 A1    May 10, 2007

(30) Foreign Application Priority Data

Nov. 2, 2005 (JP) .............................. 2005-319326
Nov. 1, 2006 (JP) .............................. 2006-297793

(51) Int. Cl.
*B32B 3/02* (2006.01)

(52) U.S. Cl. ................... 428/64.1; 428/64.4; 428/64.5; 428/64.6; 430/270.13

(58) Field of Classification Search ...................... None
See application file for complete search history.

(56) References Cited

U.S. PATENT DOCUMENTS

| 6,278,684 | B1 * | 8/2001 | Chiang et al. ............... 369/288 |
| 6,896,946 | B2 * | 5/2005 | Chen ......................... 428/64.1 |
| 2003/0228462 | A1 * | 12/2003 | Chen ......................... 428/336 |

FOREIGN PATENT DOCUMENTS

| JP | 09-204687 |   | 8/1997 |
| JP | 09306029 | A * | 11/1997 |
| JP | 2004-111016 |   | 4/2004 |
| JP | 2005-071577 |   | 3/2005 |
| JP | 2005-174425 |   | 6/2005 |

* cited by examiner

*Primary Examiner*—Elizabeth Mulvaney
(74) *Attorney, Agent, or Firm*—Young & Thompson

(57) ABSTRACT

A phase change optical disk includes a first dielectric film, a recording film, a second dielectric film and a reflecting film which are consecutively formed on a substrate. The second dielectric film includes therein a zinc sulfide at a rate of 10 to 40 mol % and a tantalum oxide at a rate of 20 to 50 mol %, for preventing sulfuration of Ag in the reflecting film.

13 Claims, 4 Drawing Sheets

OPTICAL DISK INCLUDING A SULFURATION SUPPRESSING DIELECTRIC FILM

BACKGROUND OF THE INVENTION (a) Field of the Invention

The present invention relates to an optical recording medium and, more particularly, to an optical disk for recording/reproducing thereon information by irradiating a laser beam onto a recording film to change the optical characteristic of the recording film.

The present invention also relates to an optical read-only-memory (ROM) disk including a super-resolution optical ROM film from which data are reproduced using a super resolution technique.

(b) Description of the Related Art

In general, rewritable optical disks, such as magneto-optical disk and phase change disk, are used for recording/reproducing information by irradiating a laser beam onto a recording film to thereby change the optical characteristics thereof such as the magneto-optical characteristic, reflectance and optical phase. Optical disks have been required to have a higher recording capability, and now achieved a 16-fold-speed recording scheme as in the DVD-R and DVD-RAM. The optical disks are also required to have a larger recording capacity in addition to the higher-speed recording capability.

For increasing the recording capacity of an optical disk, it is effective to record/reproduce the information by using a small-diameter laser beam. Thus, vigorous researches have been conducted on the study of optical disks on which the information is recorded/reproduced using a laser beam having a wavelength of around 405 nm. Such an optical disk generally uses a reflecting film configured by a material including Ag as a main component thereof. This is because the Ag can be obtained at a lower cost compared to the other precious metals, and has a higher reflectance at a wavelength range around 405 nm and a higher thermal conductivity, thereby achieving a higher-speed recording and yet allowing a higher signal amplitude in the reproduced signal.

In general, the phase change optical disk has a configuration wherein a first dielectric film, a recording film, a second dielectric film and a reflecting film are consecutively deposited on a substrate. These dielectric films may be formed as a multilayer dielectric film, if desired. A so-called interface film may be additionally formed between the dielectric film and the reflecting film for improving the crystallization rate or increasing the number of overwrite times. A $ZnS—SiO_2$ film including mixture of ZnS and $SiO_2$ is widely used as the dielectric film in the phase change optical disk. The $ZnS—SiO_2$ film has a refractive index as high as around 2.2, and a higher sputtering rate suited to a mass production. In general, a $ZnS—SiO_2$ dielectric film having a ZnS content of 50 to 80 mol % is widely used, and a composition of $(ZnS)_{80}—(SiO_2)_{20}$ is most popularly used, the $(ZnS)_{80}—(SiO_2)_{20}$ including ZnS at a rate of 80 molar percent (mol %) and $SiO_2$ at a rate of 20 mol %.

It should be noted here that Ag is liable to sulfuration and thus, arrangement of the reflecting film including Ag adjacent to the dielectric film including $ZnS—SiO_2$ in the phase change optical disk necessitates the scheme of preventing sulfuration of Ag. Patent Publication JP-2004-111016 describes an optical disk having a sulfuration suppressing film, such as including SiC, SiN and GeN.

Use of the sulfuration suppressing film increases the filming step in the manufacture of the phase change optical disk to decrease the mass production rate of the optical disk, however. There is no known technique to suppress the sulfuration of the Ag-containing reflecting film in the mass production of the optical disk without using such a sulfuration suppressing film.

SUMMARY OF THE INVENTION

In view of the above problem in the conventional technique, it is an object of the present invention to provide an optical recording medium including an Ag-containing reflecting film and having a sulfuration suppressing function without using an additional sulfuration suppressing film therein.

It is another object of the present invention to provide an optical ROM disk including an optical ROM film having a phase change property upon irradiation of a laser beam and having a sulfuration suppressing function without using an additional sulfuration suppressing film therein.

The present invention provides an optical disk including a substrate, and a layer structure overlying the substrate, the layer structure including: a recording film having a phase change property upon irradiation of a laser beam; and a first dielectric film including therein a zinc sulfide at a rate of 40 mol % or less and a tantalum oxide at a rate of 20 mol % or more.

The present invention also provides an optical ROM disk including a substrate, and a layer structure overlying the substrate, the layer structure including: an optical ROM film having a phase change property upon irradiation of a laser beam; and a first dielectric film including therein a zinc sulfide at a rate of 40 mol % or less and a tantalum oxide at a rate of 20 mol % or more.

In accordance with the optical recording medium and optical ROM disk of the present invention, the configuration wherein the first dielectric film includes therein a zinc sulfide at a rate of 40 mol % or less and a tantalum oxide at a rate of 20 mol % or more provides a sulfuration suppressing function to the first dielectric film. Thus, sulfuration of the Ag-containing film can be suppressed without using an additional interface film and thus without complicating the process for manufacturing the optical disk including the Ag-containing film.

The above and other objects, features and advantages of the present invention will be more apparent from the following description, referring to the accompanying drawings.

BEST MODES OF THE INVENTION

Now, the present invention is more specifically described with reference to accompanying drawings, wherein similar constituent elements are designated by similar reference numerals.

Figure 1:
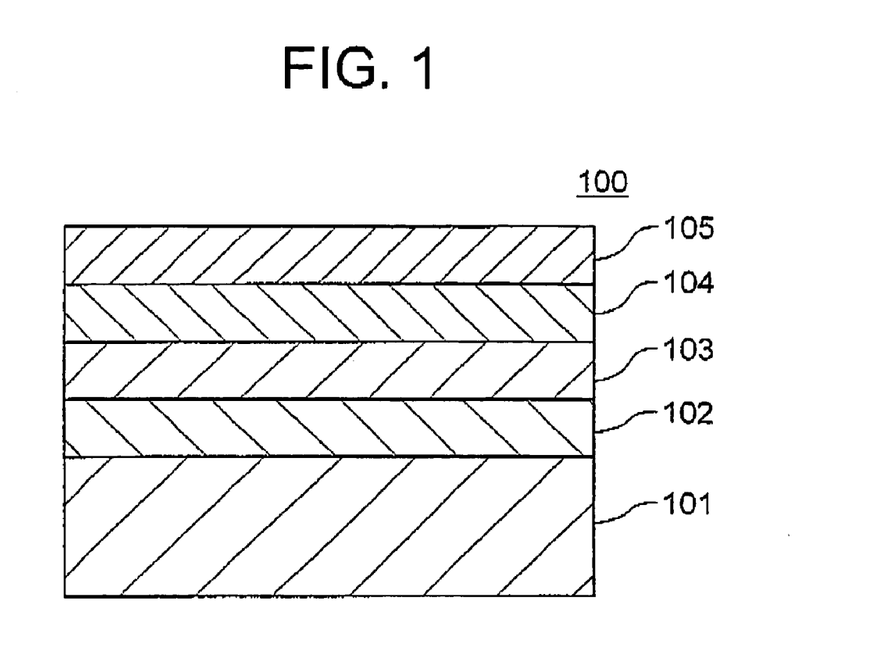
FIG. 1 is a schematic sectional view of an optical recording medium according to an embodiment of the present invention.

FIG. 1 shows the structure of an optical recording medium according to an embodiment of the present invention. The optical recording medium generally designated by numeral 100 is configured as a phase change optical disk including a substrate 101 and a layer structure formed thereon. The layer structure includes a first dielectric film 102, a recording film 103, a second dielectric film 104 and a reflecting film 105, which are consecutively layered on the substrate 101. The substrate 101 may be made of a plastic material such as polycarbonate (PC), or a glass material. The recording film 103 may be made of GeSbTe and AgInSbTe, which are generally used in the recording film of a conventional optical disk.

The reflecting film 105 may be preferably made from a material including Ag as a main component thereof, in the view point of higher thermal conductivity and higher optical transmission factor thereof. The reflecting film 105 including Ag as a main component thereof may be preferably added with a suitable amount of at least one element selected from the group consisting of Pd, Cu, Ge, In and Nd. The first dielectric film 102 may be made of $ZnS$—$SiO_2$ generally used for this purpose. The composition of $ZnS$—$SiO_2$ may be such that x in the molar-percent notation of $(ZnS)_x''(SiO_2)_{1-x}$ resides in the range of $0.5 \leq x \leq 0.9$. The second dielectric film 104 includes a zinc sulfide (ZnS) and a tantalum oxide ($Ta_2O_5$). An interface film may be inserted, if desired, between the recording film 103 and the first dielectric film 102 and/or second dielectric film 104, for the purpose of improving the crystallization rate and increasing the number of overwrite times of the recording film 104. The interface film may be made of GeN, SiC or SiN.

In the conventional optical disk, arrangement of a dielectric film including $ZnS$—$SiO_2$ adjacent to the Ag-containing reflecting film necessitates insertion of a sulfuration suppressing film such as including SiC, SiN or GeN between the Ag-containing reflecting film and the adjacent dielectric film. In the optical disk of the present embodiment, the ZnS content may be reduced to below 40 mol % in the dielectric film, and a tantalum oxide is mixed therewith at a content of 20 mol % or more together with an additive of aluminum oxide, silicon oxide, yttrium oxide, bismuth oxide and/or cerium oxide, to further suppresses sulfuration of Ag. This behavior or function was found in the experiments conducted by the inventors, and is considered due to the fact that reduction of the ZnS concentration in the dielectric film reduces an excessive sulfur content, which might cause sulfuration of Ag.

It should be noted however that the mere reduction of the ZnS content in the $ZnS$—$SiO_2$ material to obtain a $(ZnS)_{40mol\%}$—$(SiO_2)_{60mol\%}$ material, for example, does not provide an effective sulfuration suppressing function, and that inclusion of tantalum oxide at a suitable amount such as above 20 mol % is essential for the effective sulfuration suppressing function.

The content of tantalum oxide does not have an upper limit for the effective sulfuration suppressing function; however, a tantalum oxide content above 50 mol % degrades the overwrite characteristic of the optical recording medium and reduces the sputtering rate thereof in the sputtering process of the dielectric film to thereby degrade the mass production rate. Thus, the content of tantalum oxide should be maintained within a range between 20 mol % and 50 mol % inclusive of both.

The second oxide film 104 may preferably include, in addition to the zinc sulfide and tantalum oxide, at least one of the materials selected from the group consisting of aluminum oxide, silicon oxide, yttrium oxide, bismuth oxide and cerium oxide. Inclusion of such an additive or additives may improve the recording/reproducing characteristics such as the erasing factor and number of overwrite times. Among others, addition of one or mixture of the aluminum oxide, yttrium oxide and bismuth oxide is more preferable, because it improves the erasing factor and thus provides a higher-speed recording capability.

In the following samples of the present embodiment or invention, ZnS, $Ta_2O_5$, $Al_2O_3$, $SiO_2$, $Y_2O_3$, $Bi_2O_3$, $CeO_2$ were used as an example of zinc oxide, tantalum oxide, aluminum oxide, silicon oxide, yttrium oxide, bismuth oxide and cerium oxide, respectively. These compounds were mixed at a specific ratio and subjected to sintering to obtain a sputtering target, which was used in the sputtering process to form the dielectric films in the optical disk of the present embodiment.

Samples 1

Samples 1 of the optical disk of the present embodiment were manufactured by consecutively depositing the first dielectric film 102, recording film 103, second dielectric film 104 and reflecting film 105 on a PC substrate 101 by sputtering, wherein a plurality of sputtering targets having a variety of compositions were used among these samples for depositing the second dielectric film 104 therein. The first dielectric film 102 included $(ZnS)_{80}$—$(SiO_2)_{20}$ and was 50 nm thick. The numerals 20, 80 in the $(ZnS)_{80}$—$(SiO_2)_{20}$ specify the molar percents therein, and the same applies to other materials recited in this text. The recording film 103 included $Ge_8Te_8$—$Sb_2Te_3$ and was 15 nm thick. The reflecting film 105 included AgPdCu and was 100 nm thick. The second dielectric film 104 was 15 nm thick.

The samples 1 of the optical disk thus manufactured were initialized and subjected to an environmental test for examining presence or absence of sulfuration after the environmental test. The defective area, in which the sulfuration occurred after the environmental test, had a color different from the color of the other normal area. Thus, the presence or absence of sulfuration can be examined by visual inspection or using a microscope. The environmental test was conducted for 500 hours under the condition of ambient temperature at 85 degrees C. and relative humidity at 90%. The relationship between the target composition and the result of sulfuration inspection after the environmental test is shown in the following Table 1.

TABLE 1

| Material of Second dielectric film | Sulfuration |
| --- | --- |
| $(ZnS)_{80}$—$(SiO_2)_{20}$ | Present |
| $(ZnS)_{10}$—$(SiO_2)_{90}$ | Present |
| $(ZnS)_{50}$—$(Ta_2O_5)_{50}$ | Present |
| $(ZnS)_{40}$—$(Ta_2O_5)_{60}$ | Absent |
| $(ZnS)_{40}$—$(Ta_2O_5)_{50}$—$(Al_2O_3)_{10}$ | Absent |
| $(ZnS)_{40}$—$(Ta_2O_5)_{30}$—$(Al_2O_3)_{30}$ | Absent |
| $(ZnS)_{40}$—$(Ta_2O_5)_{15}$—$(Al_2O_3)_{45}$ | Present |

With reference to the above Table 1, if the second dielectric film 104 includes $ZnS$—$SiO_2$ similarly to the conventional technique, sulfuration will occur irrespective of the composition of the ZnS—$SiO_2$. On the other hand, if ZnS and $Ta_2O_5$ are mixed together, with the ZnS content being equal to or below 40 mol %, the sulfuration can be suppressed. As understood from Table 1, the molar ratio of $Ta_2O_5$ may be more than 50 mol % in the view point of suppressing the sulfuration. On the other hand, the molar ratio of $Ta_2O_5$ equal to or below 20 mol % incurs the sulfuration. Thus, the preferable content of $Ta_2O_5$ in the view point of sulfuration suppressing function is equal to or more than 20 mol %.

Samples 2

Samples 2 were manufactured similarly to the samples 1, by using sputtering targets having different compositions for the second dielectric film among the samples 2. The first dielectric film 102 included $(ZnS)_{80}$—$(SiO_2)_{20}$ and was 50 nm thick. The recording film 103 included $Ge_8Te_8$—$Sb_2Te_3$ and was 15 nm thick. The reflecting film 105 included AgPdCu and was 100 nm thick. The second dielectric film 104 was 15 nm thick. The second dielectric film 104 included ZnS—$Ta_2O_5$, which was mixed with $Al_2O_3$, $SiO_2$, $Y_2O_3$, $Bi_2O_3$ or $CeO_2$ for each of the samples 2, and was 15 nm thick.

The PC substrate 101 had a 25-nm-deep spiral groove thereon for a tracking servo control, the spiral groove being wound at a pitch of 0.4 µm. An optical head including a laser device having an emission wavelength of 405 nm and an objective lens having a numerical aperture of 0.65 was used to measure the recording/reproducing characteristic of the optical disk, thereby investigating the relationship between the composition of the sputtering target for the second dielectric film 104 and the number of overwrite times. The number of overwrite times Was measured for the case wherein a 1-µm-long record mark was iteratively overwritten on the optical disk at a linear speed of 6.6 m per second (m/s). The overwrite operation was stopped after the carrier-to-noise ratio (C/N) in the reproduced signal was degraded by 3 decibels from the initial C/N ratio, to employ the number of overwrite times at the stop. The results of the overwrite test is shown in Table 2.

TABLE 2

| Material of Second dielectric film | Number of overwrite times |
|---|---|
| $(ZnS)_{40}$—$(Ta_2O_5)_{60}$ | 500 |
| $(ZnS)_{40}$—$(Ta_2O_5)_{50}$—$(Al_2O_3)_{10}$ | 1000 |
| $(ZnS)_{20}$—$(Ta_2O_5)_{45}$—$(Al_2O_3)_{35}$ | 3000 |
| $(ZnS)_{10}$—$(Ta_2O_5)_{50}$—$(Al_2O_3)_{40}$ | 1000 |
| $(ZnS)_{5}$—$(Ta_2O_5)_{50}$—$(Al_2O_3)_{45}$ | 400 |
| $(ZnS)_{40}$—$(Ta_2O_5)_{50}$—$(SiO_2)_{10}$ | 2000 |
| $(ZnS)_{40}$—$(Ta_2O_5)_{50}$—$(Y_2O_3)_{10}$ | 3000 |
| $(ZnS)_{40}$—$(Ta_2O_5)_{50}$—$(Bi_2O_3)_{10}$ | 3000 |
| $(ZnS)_{40}$—$(Ta_2O_5)_{50}$—$(CeO_2)_{10}$ | 1000 |

With reference to Table 2 together with Table 1, the composition, $(ZnS)_{40}$—$(Ta_2O_5)_{60}$, for which the sulfuration did not occur in the samples 1 provided a smaller number of overwrite times, 500. In view of the results shown in Table 1, the molar ratio of $Ta_2O_5$ should preferably reside between 20 mol % and 50 mol %. It will be also understood that the $Ta_2O_5$ content should be equal to or below 50 mol %, and addition of $Al_2O_3$, $SiO_2$, $Y_2O_3$, $Bi_2O_3$ and $CeO_2$ will provide an improved overwrite characteristic. Among others, addition of $Y_2O_3$ or $Bi_2O_3$ remarkably improves the overwrite characteristic, as understood from Table 2. However, addition of tantalum oxide or aluminum oxide in the case of a ZnS content below 10 mol % does not significantly increase the number of overwrite times. Thus, ZnS content should be equal to or above 10 mol %. The results of test for the samples 2 and samples 1 revealed a preferable range of ZnS content, which resides between 10 mol % and 40 mol % inclusive of both.

Samples 3

Samples 3 of the optical disk of the present embodiment were manufactured similarly to the samples 1, by using a variety of sputtering targets having different compositions. The substrate 101, first dielectric film 102, recording film 103 and reflecting film 105 were similar to those in the samples 1. The sputtering targets for the second dielectric film 104 had the compositions shown in Table 3.

The optical head used herein was same as that used for the samples 2, and the configuration of the optical disk was similar to that used for the samples 2 except for the composition of the second dielectric film 104. The relationship between the upper limit of the overwrite-mode linear speed, at which overwrite of data on the recording film 103 is possible, and the composition of the sputtering target for the second dielectric film 104 was investigated. The investigation of the upper limit of the overwrite-mode linear speed was such that a 1-µm-long record mark was recorded at different linear speeds and then erased by a DC erasure technique, and thereafter, a highest linear speed was selected among the linear speeds at which a DC erasure factor of 26 decibels or above was obtained. The results of the test for the samples 3 are shown in Table 3.

TABLE 3

| Material of Second dielectric film | Upper limit of linear speed (m/s) |
|---|---|
| $(ZnS)_{80}$—$(SiO_2)_{20}$ | 5 |
| $(ZnS)_{30}$—$(Ta_2O_5)_{40}$—$(SiO_2)_{30}$ | 6 |
| $(ZnS)_{30}$—$(Ta_2O_5)_{40}$—$(Al_2O_3)_{30}$ | 12 |
| $(ZnS)_{30}$—$(Ta_2O_5)_{40}$—$(Y_2O_3)_{30}$ | 11 |
| $(ZnS)_{30}$—$(Ta_2O_5)_{40}$—$(Bi_2O_3)_{30}$ | 10 |
| $(ZnS)_{30}$—$(Ta_2O_5)_{40}$—$(CeO_2)_{30}$ | 6 |

With reference to Table 3, the material obtained by addition of $Al_2O_3$, $Y_2O_3$ or $Bi_2O_3$ to the mixture of ZnS and $Ta_2O_5$ in the second dielectric film 104 increases the upper limit of the overwrite-mode linear speed. More specifically, the increase of the upper limit of the overwrite-mode linear speed can be obtained by using the ZnS—$Ta_2O_5$ material mixed with $Al_2O_3$, $Y_2O_3$ or $Bi_2O_3$ in the second dielectric film without an additional interface film 104 provided adjacent to the recording film 103.

Samples 4

Figure 2:
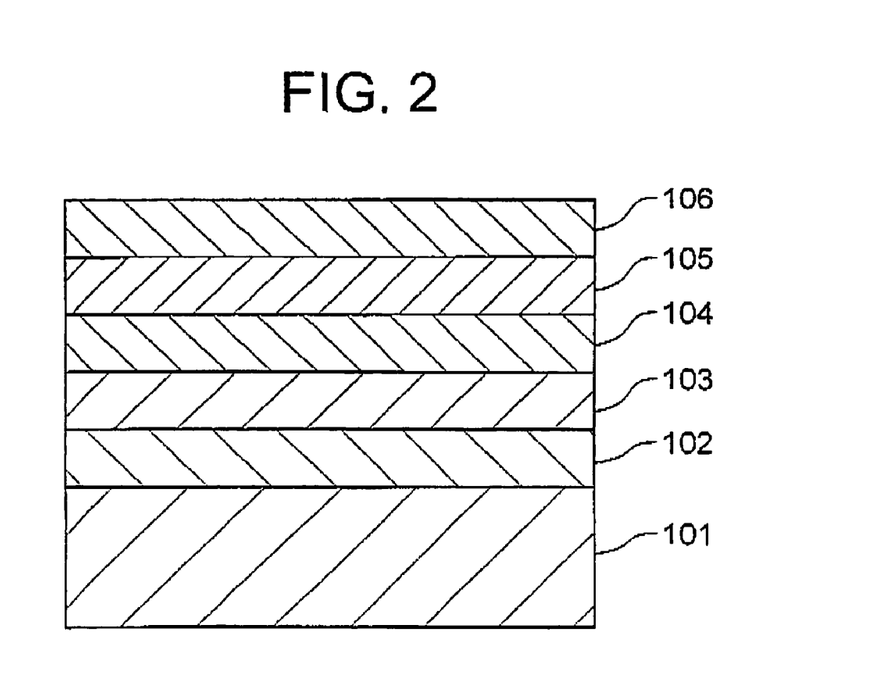
FIG. 2 is a schematic sectional view of samples 4 of the present invention.

Samples 4 of the present invention were manufactured by consecutively forming, as shown in FIG. 2, a first dielectric film 102, a recording film 103, a second dielectric film 104, reflecting film 105 and a third dielectric film 106 on a PC substrate 11, by using a sputtering target. These layers are referred to as a first layer structure. It is to be noted that the optical disk shown in FIG. 2 is in fact a double-recording-layer phase change optical disk, and this optical disk further includes a second layer structure on the top third dielectric film 106, although not specifically depicted in the figure.

The second layer structure includes a fourth dielectric film, another recording film, a fifth dielectric film and another reflecting film. The first layer structure depicted in FIG. 2 is generally referred to as a L0 medium, which is nearer from the PC substrate 101 compared to the second layer structure configuring a L1 medium.

The first dielectric film 102 included ZnS—$SiO_2$, and was 40 nm thick. The recording film 103 included $Ce_8Te_8$—$Bi_{1.9}In_{0.1}Te_3$, and was 7 nm thick. The second dielectric film 104 included (ZnS)—($Y_2O_3$)—($Ta_2O_5$), and was 15 nm thick. The reflecting film 105 included AgPdCu, and was 15 nm thick. The third dielectric film 106 included (ZnS)—

$(Y_2O_3)$—$(Ta_2O_5)$ similarly to the second dielectric film 104, and was 30 nm thick. The second and third dielectric films 104 and 106 were formed by using a sputtering target having a composition of $(ZnS)_{30}$—$(Y_2O_3)_{30}$—$(Ta_2O_5)_{40}$ and using Ar as a sputtering gas.

In general, the L0 medium has an optical transmission factor of 40% or above, and preferably 45% or above, thereby allowing the light passed by the reflecting film 105 to be incident onto the second layer structure thereby recording/reproducing data on the another recording film. In the samples 4 of the present invention, an optical transmission factor as high as 48% or above was obtained. An environment test conducted for 500 hours under the condition of ambient temperature at 85 degrees and relative humidity at 90% did not incur an erosion caused by the sulfuration.

As described with reference to the preferred embodiment of the present invention, the second dielectric film having a zinc oxide content of 40 mol % or less and a tantalum oxide content of 20 mol % or more suppresses sulfuration of the Ag-containing reflecting film 105 while disposing the second dielectric film 104 in contact with the Ag-containing reflecting film 105. This provides a phase change optical disk having an Ag-containing reflecting film, without degrading the mass production capability of the optical disk. Addition of silicon oxide, aluminum oxide, yttrium oxide or bismuth oxide improves the number of overwrite times and the upper limit of the overwrite-mode linear speed, without using an additional interface film.

A mere suppression of the sulfuration may be obtained by using a material including no sulfur, such as silicon oxide, silicon nitride, aluminum oxide, tantalum oxide as in the conventional optical disk. However, these materials degrade the overwrite characteristic of the optical disk. On the other hand, the $ZnS$—$Ta_2O_5$ material used in the optical disk of the present embodiment improves the crystallization rate of the recording film 103 while suppressing the sulfuration.

In the above embodiment, the second dielectric film 104 adjacent to the Ag-containing reflective film 105 included $ZnS$—$Ta_2O_5$, and the first dielectric film 102 included $ZnS$—$SiO_2$; however, the first dielectric film 102 may include $ZnS$—$Ta_2O_5$ similarly to the second dielectric film 104. In this case, although the first dielectric film 102 has no sulfuration suppressing function, the first dielectric film 102 improves the overwrite characteristic of the optical disk and increases the overwrite-mode linear speed.

Figure 3:
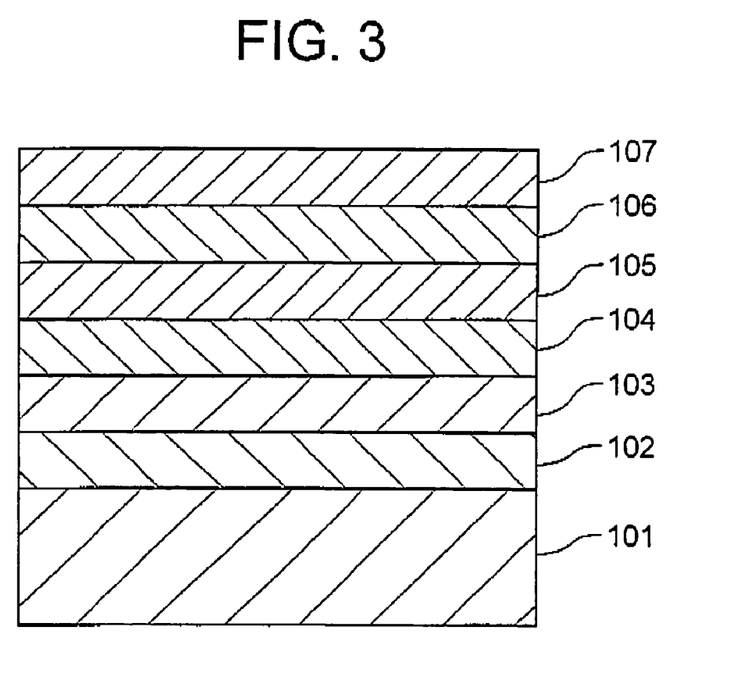
FIG. 3 is a schematic sectional view of a modification from the samples 4.

In the fourth samples, the third dielectric film 106 was formed on the Ag-containing reflecting film 105; however, another dielectric film 107 having a higher refractive index may be provided on the third dielectric film 106, as shown in FIG. 3. The another dielectric film, i.e., high-refractive-index film 107 may include niobium oxide, titanium oxide or a mixture thereof. This provides a further improvement of the optical transmission factor of the first layer structure, and yet is liable to peel-off of the high-refractive-index film 107 due to the higher stress therein. $ZnS$—$Ta_2O_5$ in the third dielectric film 106 may suppress such peel-off by alleviating the stress in the high-refractive-index film 107.

Figure 4:
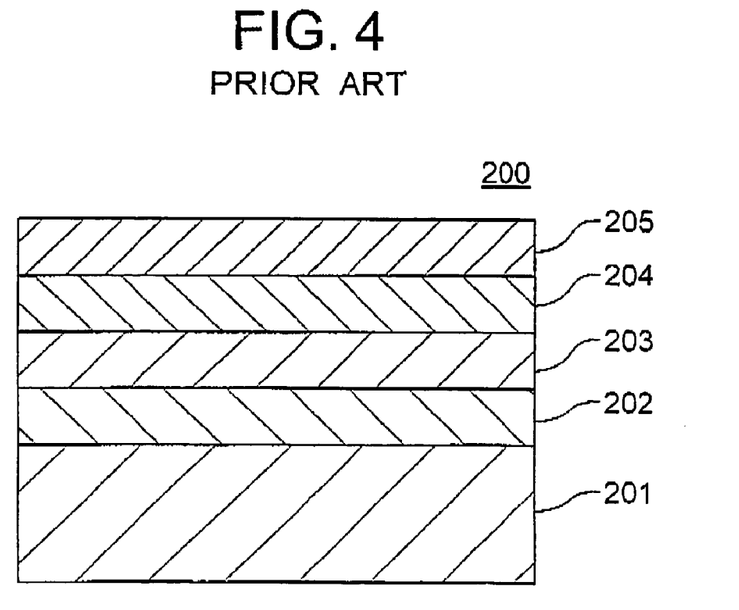
FIG. 4 is a schematic sectional view of a super-resolution optical ROM disk.

As a technique for increasing the data density of an optical ROM disk, a super-resolution optical ROM disk shown in FIG. 4 is known in the art. The super-resolution optical ROM disk, generally designated by 200, includes a substrate 201, and a layer structure formed thereon and including dielectric film 202, super-resolution ROM film 203, dielectric film 204 and a reflecting film 205. The super-resolution ROM film 203 is configured by a phase change optical film. Upon reproduction of data from the super-resolution ROM film 203, a portion of the super-resolution ROM film 203 is melted by a reproducing laser beam having a power higher than a normal reproducing power used for the normal optical ROM disk.

The melted portion has an optical constant different from the optical constant of the other portion not melted due to the specific function of the dielectric films 202, 204 having a specific thickness. Reproduction of the data is achieved by using a laser beam having a beam diameter smaller than the beam diameter of the recording laser beam used for recording the data, the reproducing laser beam melting a specified portion of the super-resolution ROM film to be reproduced therefrom. The difference in the optical characteristic may be such that the melted portion has a higher reflectance than the other portion. The super resolution technique improves the recording density of the ROM disk.

A normal optical ROM disk generally includes a reflecting film made of a metal such as Ag, Al and Au, and does not include a protective film including therein sulfur to thereby protect the reflecting film. On the other hand, the super-resolution optical ROM disk including the super-resolution ROM film 203 has a reflecting film 205 and a pair of protective dielectric films 202, 204. Protective dielectric film 204 suppresses chemical reaction between the reflecting film 205 and the super-resolution ROM film 203, the reflecting film 205 increasing the optical signal amplitude for the super-resolution ROM film or recorded optical film 203. The reflecting film preferably includes therein metal such as Ag as in the case of a normal optical disk on which data is to be recorded because the metallic reflecting film has a higher heat conductivity. The higher heat conductivity of the reflecting film allows the heat generated in the super-resolution ROM film during the reproduction to be quickly radiated through the reflecting film 205. This alleviates the thermal burden on the super-resolution ROM film 203, thereby assuring a number of overwrite times thereof.

Figure 5:
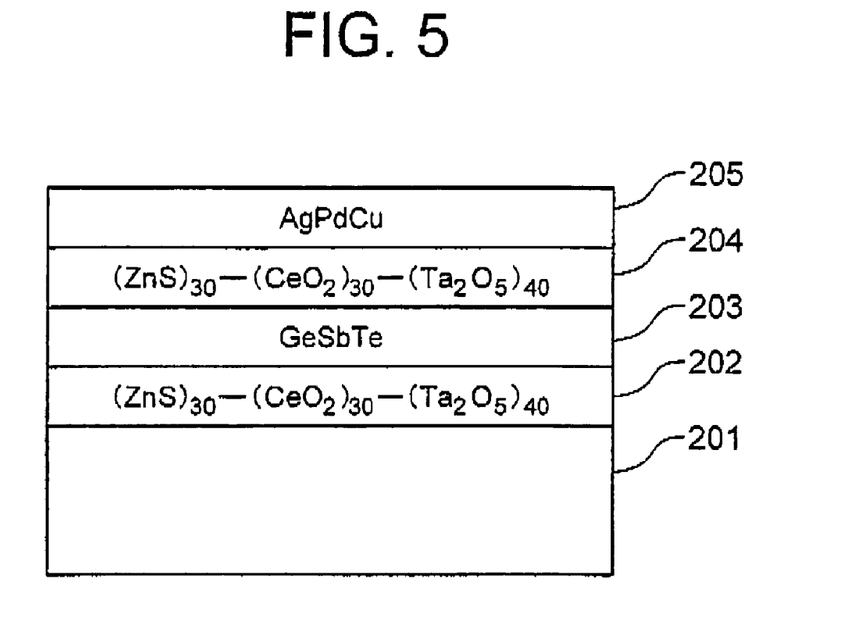
FIG. 5 is a schematic sectional view of samples 5 of the present invention.
Figure 6:
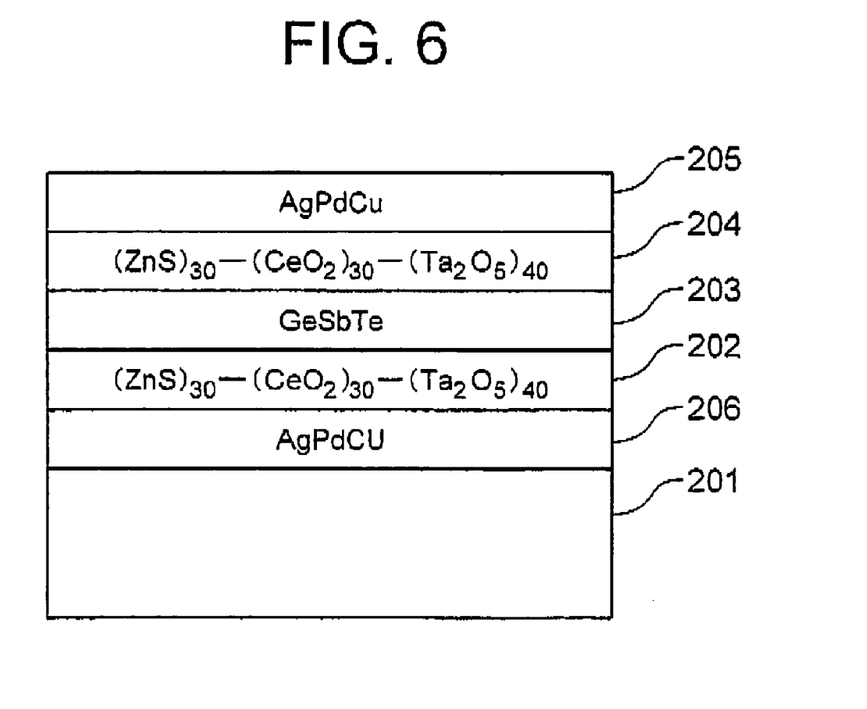
FIG. 6 is a schematic sectional view of other samples 5 of the present invention.

It is quite effective to provide a protective film including a specific amount of tantalum oxide instead of sulfur for improving reliability of the optical disk having an Ag-containing reflecting film. FIGS. 5 and 6 show configuration of the super-resolution optical ROM disk used as samples 5 of the present invention. The super-resolution ROM film 203 is configured by GeSbTe, and the reflecting film 205 is configured by AgPdCu. The dielectric films 202, 204 are configured by $(ZnS)$—$(CeO_2)$—$(Ta_2O_5)$, wherein the content ratio of zinc sulfide is 40 mol % or less, and the content ratio of tantalum oxide is 20 mol % or more. Dielectric film 202 may be configured by $(ZnS)$—$(SiO_2)$ because dielectric film 202 is not in contact with the film including Ag as in the case of dielectric film 102 shown in FIG. 1.

The optical disk shown in FIG. 6 is an example of the super resolution ROM disk wherein a melted portion has a refractive index higher than the refractive index of a non-melted portion. For achieving such a configuration, an additional Ag-containing film, or refractive index adjusting film 206, is provided on the substrate 201. The dielectric films 202, 204 include the zinc oxide at 40 mol % or less; and the tantalum oxide at 20 mol % or more. Provision of the dielectric films in contact with the reflective film 205 and refractive index adjusting film 206 both including Ag prevents corrosion of Ag, to thereby improve reliability of the optical disk.

In the optical disks shown in FIGS. 5 and 6, the dielectric films 202, 204 included $(ZnS)$—$(CeO_2)$—$(Ta_2O_5)$; however, is not limited thereto. Another protective film is also effective, so long as the another protective film includes zinc sulfide at 40 mol % or less, tantalum oxide at 20 mol % or more, and at least one another oxide selected from the group consisting of aluminum oxide, silicon oxide, yttrium oxide, bismuth oxide and cerium oxide.

Figure 7:
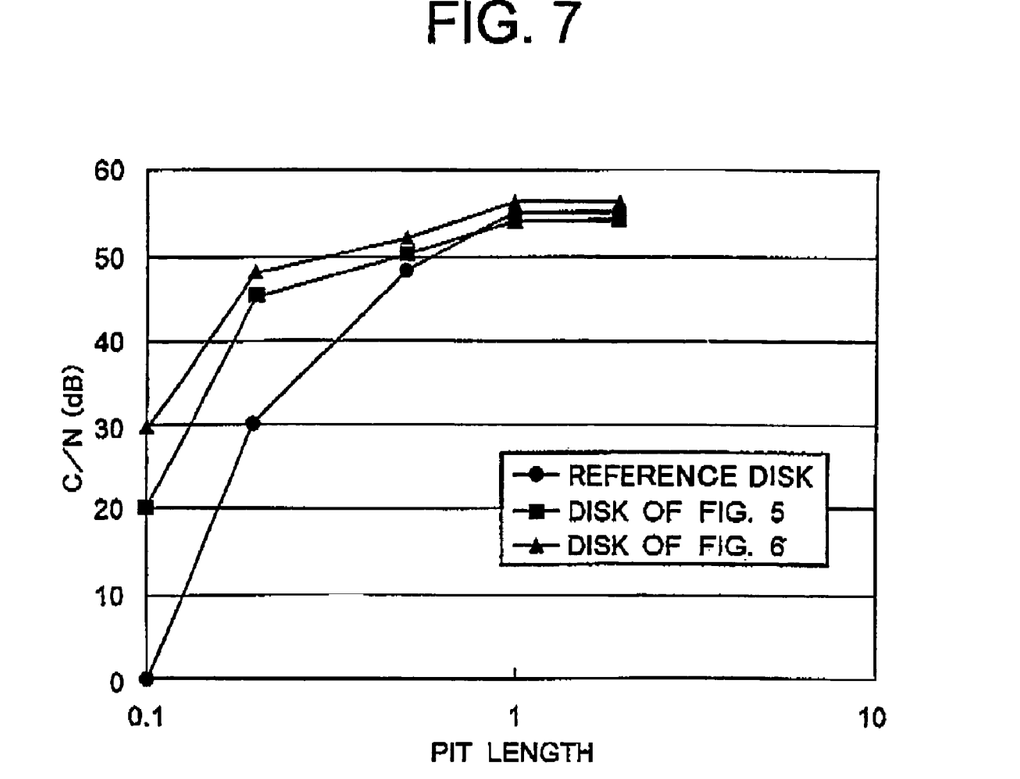
FIG. 7 is a graph showing the frequency characteristic of the samples of the super-resolution optical ROM disk shown in FIGS. 5 and 6.

Frequency characteristic of the read signal was measured for the optical disks shown in FIGS. 5 and 6 as well as a reference optical disk including an Ag-containing reflecting film on a substrate, which had a thickness of 0.6 mm and a track pitch of 0.4 μm and included thereon signal pits having a length of 0.1 to 2 μm. The resultant frequency characteristic is shown in FIG. 7, wherein the carrier-to-noise (C/N) ratio representing the signal quality of the optical disks is plotted against the pit length. Evaluation of the frequency characteristic was conducted using the optical head used in the second samples. As understood from FIG. 7, the optical disks shown in FIGS. 5 and 6 achieved a higher C/N ratio than the reference optical disk especially for a shorter pit length.

Those optical disks were subjected to an environment test at an ambient temperature of 85 degrees and a relative humidity of 90% for 500 hours, and subsequently subjected to measurement in the frequency characteristic. The frequency characteristic of the optical disks did not significantly change after the environment text, and there was no observed malfunction such as peel-off or corrosion of the film. This example reveled that those dielectric films having the above configuration and provided in contact with the Ag-containing film improves reliability of the optical disk. Thus, it is concluded that the present invention can be applied to an optical recording disk as well as an optical ROM disk, in particular, a super resolution ROM disk having a higher recording density.

As described above, the present invention is directed to an optical recording disk wherein the first dielectric film includes therein a zinc sulfide at a rate of 40 mol % or less and a tantalum oxide at a rate of 20 mol % or more.

The optical disk of the present invention may have the configurations as recited below.

The first dielectric film may include therein zinc sulfide at a rate of 10 to 40 mol % and the tantalum oxide at a rate of 20 to 50 mol %.

The first dielectric film may further include therein at least one oxide selected from the group consisting of aluminum oxide, silicon oxide, yttrium oxide, bismuth oxide and cerium oxide.

The layer structure may further include a second dielectric film formed on a surface of the reflecting film far from the first dielectric film, and the second dielectric film includes therein a zinc sulfide at a rate of 40 mol % or less and a tantalum oxide at a rate of 20 mol % or more.

The layer structure may further include a third dielectric film on the second dielectric film, the third film including at least one of niobium oxide and titanium oxide.

The layer structure may further include another dielectric film disposed between the substrate and the recording film, and the another dielectric film includes therein a zinc sulfide at a rate of 10 mol % or more and at least one oxide selected from the group consisting of aluminum oxide, silicon oxide, yttrium oxide, bismuth oxide and cerium oxide.

The present invention may be directed to a phase change optical ROM disk including a dielectric film containing at least zinc sulfide and tantalum oxide, wherein the content ratio of zinc sulfide is 40 mol % or less and the content ratio of tantalum oxide is 20 mol % or more. The dielectric film, if provided in contact with an Ag-containing film, suppresses sulfuration of Ag.

The optical ROM disk may include the first dielectric film in contact with an Ag-containing film. By configuring the dielectric film by the inventive dielectric film including zinc sulfide at 40 mol % or less and tantalum oxide at 20 mol % or more, sulfuration of Ag can be suppressed by the inventive dielectric film. This allows an additional sulfuration-suppressing film to be omitted in the optical ROM disk, thereby improving the productivity rate thereof.

A super-resolution optical ROM disk generally includes a super-resolution optical ROM film. The super resolution optical ROM disk may also include a refractive index adjusting film including Ag as a main component thereof in front of the super-resolution optical ROM film as viewed in the direction of the optical path. A dielectric film including zinc sulfide at 40 mol % or less and tantalum oxide at 20 mol % or more may be provided in contact with the refractive index adjusting film including Ag, for suppression of sulfuration of Ag.

The recording film may be suited to recording thereon using a laser beam having a wavelength of 380 to 430 nm.

Since the above embodiments are described only for examples, the present invention is not limited to the above embodiments and various modifications or alterations can be easily made therefrom by those skilled in the art without departing from the scope of the present invention.

What is claimed is:

1. An optical disk comprising a substrate, and a layer structure overlying said substrate, said layer structure including:
   a recording film having an optical characteristic that changes upon irradiation of a laser beam;
   a reflecting film having Ag as a principal component thereof; and
   a first dielectric film disposed adjacent to said reflective film and including therein a zinc sulfide at a rate of 10 mol % to 40 mol % and a tantalum oxide at a rate of 20 mol % to 50 mol %.

2. The optical disk according to claim 1, wherein said first dielectric film further includes therein at least one oxide selected from the group consisting of aluminum oxide, silicon oxide, yttrium oxide, bismuth oxide and cerium oxide.

3. The optical disk according to claim 1, wherein said recording film has a phase change property.

4. The optical disk according to claim 1, wherein said first dielectric film is interposed between said recording film and said reflecting film.

5. The optical disk according to claim 4, wherein said layer structure further includes a second dielectric film formed on a surface of said reflecting film far from said first dielectric film, and said second dielectric film includes therein a zinc sulfide at a rate of 40 mol % or less and a tantalum oxide at a rate of 20 mol % or more.

6. The optical disk according to claim 5, wherein said layer structure further includes a third dielectric film on said second dielectric film, and said third dielectric film includes at least one of niobium oxide and titanium oxide.

7. The optical disk according to claim 1, wherein said layer structure further includes a second dielectric film disposed between said substrate and said recording film, and said second dielectric film includes therein a zinc sulfide at a rate of 10 mol % or more and at least one oxide selected from the group consisting of aluminum oxide, silicon oxide, yttrium oxide, bismuth oxide and cerium oxide.

8. The optical disk according to claim 1, wherein said recording film is suited to recording thereon using a laser beam having a wavelength of 380 to 430 nm.

9. An optical ROM disk comprising a substrate, and a layer structure overlying said substrate, said layer structure including:
   an optical ROM film having a phase change property upon irradiation of a laser beam;
   an Ag-containing film; and
   a first dielectric film including 10-40 mol % zinc sulfide and 20-50 mol % tantalum oxide.

10. The optical ROM disk according to claim 9, wherein said first dielectric film further includes therein at least one oxide selected from the group consisting of aluminum oxide, silicon oxide, yttrium oxide, bismuth oxide and cerium oxide.

11. The optical ROM disk according to claim 9, wherein said Ag-containing film is a reflecting film which is in contact with said first dielectric film.

12. The optical ROM disk according to claim 9, wherein said Ag-containing film is a refractive index adjusting film which is disposed in front of said optical ROM film as viewed in a direction of an optical path of said optical ROM disk, and said first dielectric film is disposed in contact with said refractive index adjusting film.

13. The optical ROM disk according to claim 9, wherein said optical ROM film is suited to reading therefrom using a laser beam having a wavelength of 380 to 430 nm.

\* \* \* \* \*